United States Patent

Newton

[15] 3,688,517

[45] Sept. 5, 1972

[54] AIR CONDITIONING CONTROL SYSTEM
[72] Inventor: Alwin B. Newton, York, Pa.
[73] Assignee: Borg-Warner Corporation, Chicago, Ill.
[22] Filed: Dec. 21, 1970
[21] Appl. No.: 99,806

[52] U.S. Cl.....................................62/209, 62/217
[51] Int. Cl................................................F25b 41/00
[58] Field of Search........62/205, 206, 209, 210, 217, 62/222, 225

[56] References Cited

UNITED STATES PATENTS

| | | | |
|---|---|---|---|
| 1,990,663 | 2/1935 | Muffly | 62/217 |
| 1,238,051 | 8/1917 | Peterson | 62/217 |

*Primary Examiner*—Meyer Perlin
*Attorney*—Donald W. Banner, John W. Butcher and William S. McCurry

[57] ABSTRACT

A control system for air conditioning apparatus, particularly well suited for automotive applications, includes a constant pressure regulating valve between the condenser and the evaporator and a superheat responsive valve between the evaporator and the compressor. The superheat responsive valve is responsive to the temperature of air within the controlled space; and the control mechanism may be adjusted by the operator to obtain any desired setting. This assures optimum comfort air conditioning under a variety of load and air flow conditions. The system is designed to prevent carryover of liquid refrigerant into the compressor and also avoids evaporator coil freeze-up.

5 Claims, 3 Drawing Figures

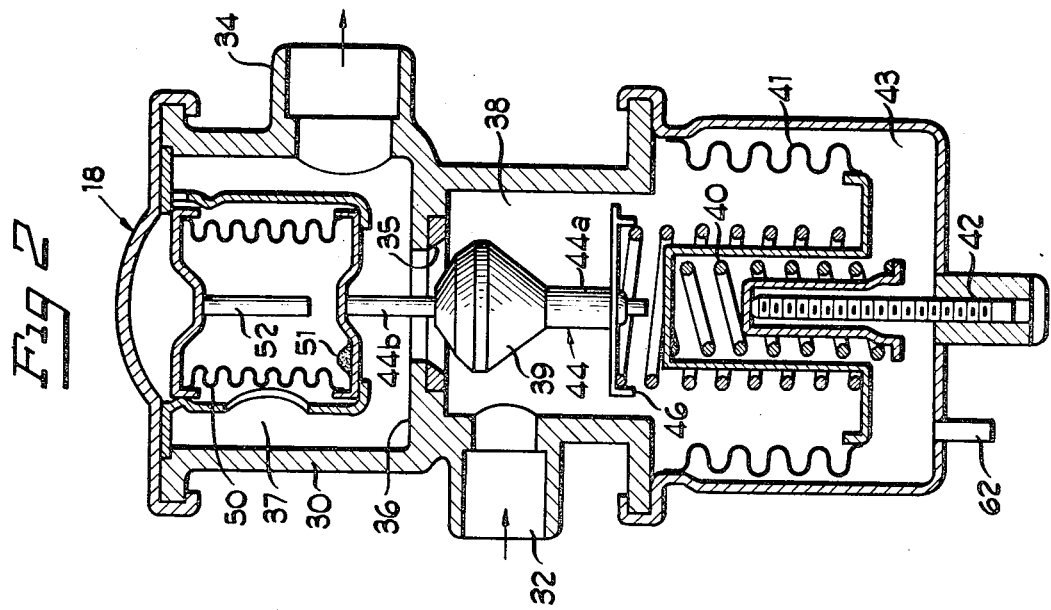
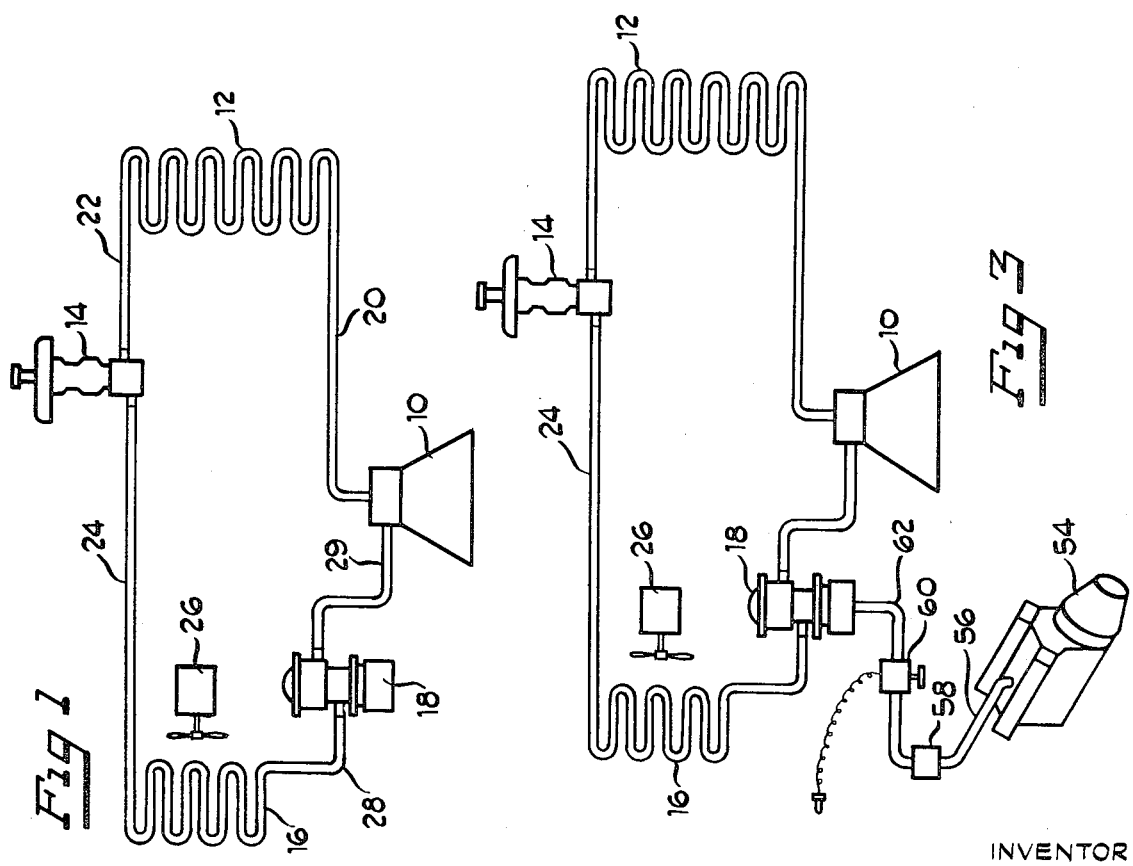

AIR CONDITIONING CONTROL SYSTEM

BACKGROUND OF THE INVENTION

1. Field of the Invention

Control of vapor cycle refrigeration or air conditioning systems of the type which include a constant pressure regulating valve to maintain a predetermined evaporator pressure, and a superheat responsive valve controlling flow of refrigerant from the evaporator to the compressor.

2. Description of Prior Art

U.S. Pat. No. 3,260,064, A. B. Newton, issued July 12, 1966, shows a system utilizing a constant pressure expansion device and a suction throttling valve sensing the temperature of refrigerant upstream from the throttling valve.

U.S. Pat. No. 3,119,559, J. W. Heidorn, issued Jan. 28, 1964, describes an automotive air conditioning system provided with an evaporator pressure regulator downstream from the evaporator and a thermal expansion valve controlling flow of refrigerant from the high side to the low side of the system.

Ford Motor Company 1970 Car Shop Manual, Vol. 3, Electrical, published Sept. 1969, p. 34-04-17, refers to a conventional automotive system in which the compressor is driven by the automotive engine through an electromagnetic clutch. A thermostat, connected in series with the clutch, senses the evaporator coil temperature and disengages the clutch when an icing condition is imminent.

SUMMARY OF THE INVENTION

This invention relates generally to control systems for air conditioning apparatus, and more particularly to a system which is especially adapted for automotive air conditioning.

Automotive air conditioning is unique in several respects in that the units must operate under wide variations in compressor speed; they must be able to cool down the interior of the automobile—which can reach as high as 140°F.—within a short time; and precautions must be taken to prevent icing of the evaporator coil because of the high capacity of the system under low load conditions. For example, a car being driven at 70 mph on a mild, cloudy day can produce suction pressures as low as 10 psig. This corresponds to about 0°F. In an R-12 charged unit.

The system described in the Ford Motor publication referred to above, which senses coil temperature, can cause the compressor to cycle four to five times a minute under low load conditions, resulting in undue wear and strain on the clutch and compressor.

In U.S. Pat. No. 3,119,559, the evaporator pressure regulating valve effectively prevents the evaporator coil pressure from dropping below a predetermined, non-icing pressure condition, for example, 32 psig. Under low loads, the evaporator becomes partially flooded, sending slugs of liquid through to the compressor. This condition sometimes results in broken compressor valves and other damage.

In U.S. Pat. No. 3,260,064 (Newton), an improved system is described which includes an adjustable pressure responsive (automatic) expansion valve and means to control the capacity of the compressor by various techniques, for example, by throttling the suction gas or by unloading one or more compressor cylinders. In the embodiment using suction gas throttling, the refrigerant temperature is sensed as the gas leaves the evaporator on the upstream side of the valve. It has been found that more stable operation can be achieved by directly sensing refrigerant superheat on the downstream side of the valve.

In one sense, the temperature responsive, suction throttling valve in the aforementioned Newton patent does sense superheat. It should be understood that "superheat" is the difference between the temperature of the refrigerant gas and the temperature at which the refrigerant boils under the existing evaporator pressure. In the Newton system, once the evaporator pressure is fixed by means of the automatic expansion valve, a simple temperature responsive valve can be set which effectively measures and controls the superheat of refrigerant leaving the evaporator. However, if the automatic expansion valve is adjusted to change the evaporator pressure, it is obvious that the superheat will change unless the suction throttling valve is also reset to a different control point.

In the present invention, a valve which is simultaneously responsive to both the temperature and pressure of refrigerant can hold any desired degree of superheat. This aspect is extremely important in comfort air conditioning in that it permits the operator to select, within limits, any desired temperature of air inside the automobile, and still maintain capacity matched to air flow (across the coil) and load conditions. For example, under low load conditions, it might be desirable to utilize the system for effective dehumidification. What this means, in effect, is that with a low load condition in a conventional system, one normally has a choice of turning off the compressor or passing substantial quantities of liquid through the compressor, while throttling its suction. In the present system, automatic or manual adjustment to increase the superheat setting of valve 18, thus reducing the portion of the evaporator in which evaporation takes place, matches capacity needs while maintaining the normal dehumidification ratio.

It has been found that more stable operation is achieved when sensing the refrigerant superheat, by measuring and responding to the pressure and temperature components of superheat on the downstream side of the valve. A combination temperature and pressure sensing element, in the form of a charged bellows, is located to take advantage of the fact that a change in the pressure of the gas tends to oppose valve movement caused by a change in its temperature. As a result, when the pressure drops in the zone immediately downstream from the valve (in response to the throttling action of the valve), the reduced pressure lowers the force on the outside of the bellows to produce an opposing force on the valve for more stable operation.

Another advantage of the system is that liquid carryover from the evaporator to the compressor is effectively prevented. Particularly at low superheat, liquid escaping from the evaporator may be only 2° or 3°F. cooler than the gas in which it is travelling on the upstream side of the valve. Upon passing through the valve, which exerts some throttling action, the resulting lower pressure causes any entrained droplets to have a much lower temperature and thus to give more prompt valve action. The temperature of gas passing through the valve is changed very little. By taking advantage of this phenomenon of amplifying the superheat in which the pressure drop across the valve is used to reduce the temperature of any droplets carried through the valve, the system does not tend to "hunt" and more stable operation is assured.

DESCRIPTION OF THE DRAWINGS

FIG. 1 is a schematic illustration of a refrigerant control system and refrigerating apparatus constructed in accordance with the principles of this invention.

FIG. 2 is a cross-section view of the superheat responsive valve utilized in the system of FIG. 1.

FIG. 3 is a schematic illustration of a modification of the system shown in FIG. 1.

DETAILED DESCRIPTION OF THE INVENTION

Referring first to FIG. 1, there is shown a conventional vapor cycle refrigeration system including compressor 10, condenser 12, expansion device 14, evaporator 16 and a superheat responsive valve 18.

Refrigerant gas is compressed in the compressor 10 and flows through line 20 to the condenser 12. Liquid refrigerant then flows through line 22 to the expansion device 14 which is of a pressure responsive type, to be described in detail below, which maintains relatively constant pressure in the evaporator. The low pressure liquid refrigerant then flows through line 24 to the evaporator, over which air is circulated by means of a blower 26. The refrigerant is evaporated from the inside of the coil and vaporized refrigerant gas flows through line 28 to the superheat responsive valve 18, and then through line 29 to compressor 10.

The pressure responsive expansion device 14 may be of the type illustrated in FIG. 10, p. 27–11 of the Air Conditioning, Refrigerating Data Book—Design Volume, 9th Edition 1955. This type of valve senses pressure on the downstream side of the valve to maintain a substantially constant pressure in the evaporator. On sensing a drop in pressure, the valve opens to permit more refrigerant to flow and will close upon an increase in pressure. This valve is also provided with means for adjusting the control point to permit various pressure settings for the evaporator.

Referring now to FIG. 2, the superheat responsive valve 18 includes a casing 30 provided with an inlet port 32 communicating with the evaporator and an outlet port 34 communicating with the compression suction line. A valve seat 35 is formed on a partition 36 dividing chamber 37 and chamber 38. Valve member 39 is supported within the casing, and is mounted on a spring assembly 40 including a diaphragm sealing bellows 41 and an adjusting mechanism 42 for varying the compression on the spring 40. The lower end 44a of the valve stem 44 engages the spring with the valve guide 46.

The upper portion of the valve stem 44b is connected to a charged bellows 50 containing a limited refrigerant fill 51, the pressure of which is a function of the temperature of the surrounding refrigerant gas in chamber 37. Preferably an internal stop 52 is employed to prevent damage to the bellows during periods of high gas pressure in chamber 37, which can occur during non-operating periods of the refrigeration system. The bellows 50 is located within the gas in chamber 37, the pressure of which opposes the pressure within the bellows. The resulting force is a function of the pressure of the gas in chamber 37. Thus, as the pressure drops in the chamber 37, in response to throttling action of the valve upon closing, reduced pressure lowers the force on the outside of the bellows 50 to produce a net opposing opening force on the valve for more stable operation.

The reverse action occurs when the valve is opened. In the operation of the valve, the charged bellows 50 senses the temperature of gas downstream of the valve in chamber 37. Upon a rise in superheat, the bellows expands, opening the valve and permitting greater flow of refrigerant to the compressor. Upon a drop in superheat, the bellows contracts and the spring force exerted on the opposite end of the valve stem causes the valve to close, resulting in reduced flow to the compressor.

In the embodiment illustrated in FIG. 3, where the same reference numerals used in FIGS. 1 and 2 illustrate equivalent components, a system is shown for controlling the operation of the superheat control valve 18 in response to a predetermined temperature, for example, the interior air temperature of the automobile. The automobile engine 54, which is normally coupled to drive the compressor 10, provides a source of vacuum by means of the subatmospheric condition existing in the intake manifold. A vacuum line 56 is connected to the intake manifold and applied to an accumulator 58 which maintains a generally constant pressure. The accumulator 58 may also be used to provide a vacuum source for a power assist brake operator and similar equipment. A conventional temperature responsive valve 60 is interposed in line 62 between the accumulator 58 and a chamber 43 in the superheat responsive valve 18 (FIG. 2).

Valve 60 may be manually adjusted by the driver of the vehicle to any temperature (within limits) he wishes to obtain in the air within the car. The valve operates to control a reference pressure within the chamber 43 surrounding sealing bellows 41 and, thereby, readjust the setting of the main spring force 40 within the valve 18. Valve 60 operates by applying increased vacuum to the aforesaid chamber surrounding bellows 41, thus reducing the spring force at 40 when increased capacity is required and, conversely, by bleeding in atmospheric air to chamber 43, thus increasing the spring thrust at 40 (to require a higher superheat in such line 29), when less capacity is required in the car.

While the invention has been described in connection with certain specific embodiments thereof, it is to be understood that this is by way of illustration and not by way of limitation; and the scope of the appended claims should be construed as broadly as the prior art will permit.

What is claimed is:

1. Refrigeration apparatus comprising: a compressor, a condenser, a constant pressure expansion device, and an evaporator connected in a closed circuit, vapor cycle system through which a refrigerant is circulated; valve means interposed between said evaporator and said compressor to control the flow of refrigerant therebetween; means for adjusting the opening force required to open said valve means, said means including a resilient member opposing the opening force on said valve means and means for adjusting the compressive preload on said resilient member; and valve control means actuating said valve means including means sensing the superheat of refrigerant downstream from said valve means to maintain a predetermined superheat of refrigerant flowing through said valve means.

2. Apparatus as defined in claim 1 wherein said means for adjusting the compressive preload includes a pressure sensitive element.

3. Apparatus as defined in claim 2 including means for controlling the pressure applied to said pressure sensitive element, said means including a relatively constant vacuum source, means interconnecting said pressure sensitive element and said vacuum source, and temperature responsive means for varying the effect of said vacuum source on said pressure sensitive element.

4. Apparatus as defined in claim 3 wherein said temperature responsive means senses the temperature of air in the space to be conditioned.

5. Apparatus as defined in claim 4 wherein the temperature responsive means is adjustable.

* * * * *